(12) United States Patent
Minoura et al.

(10) Patent No.: US 6,997,280 B2
(45) Date of Patent: Feb. 14, 2006

(54) WORKING VEHICLE PROPELLED BY INDEPENDENTLY DRIVEN RIGHT AND LEFT RUNNING UNITS

(75) Inventors: Akira Minoura, Sakai (JP); Teruo Shimamura, Sakai (JP); Masahiro Yamada, Sakai (JP); Yoshikazu Togoshi, Sakai (JP); Hironori Tsuchihashi, Sakai (JP); Osami Fujiwara, Sakai (JP); Yoshiyuki Esaki, Sakai (JP)

(73) Assignee: Kubota Corporation, Osaka (JP)

( * ) Notice: Subject to any disclaimer, the term of this patent is extended or adjusted under 35 U.S.C. 154(b) by 49 days.

(21) Appl. No.: 10/649,331

(22) Filed: Aug. 26, 2003

(65) Prior Publication Data

US 2004/0112667 A1    Jun. 17, 2004

(30) Foreign Application Priority Data

Sep. 24, 2002   (JP) .............................. 2002-277727

(51) Int. Cl.
*B60K 17/356* (2006.01)

(52) U.S. Cl. ...................................... 180/291; 180/308
(58) Field of Classification Search ................ 180/54.1, 180/6.2, 6.3, 6.32, 291, 292, 68.4, 68.6, 908, 180/305, 307, 308
See application file for complete search history.

(56) References Cited

U.S. PATENT DOCUMENTS

| 2,876,657 | A | * | 3/1959 | Allin, Sr. et al. ............. 475/29 |
| 3,612,199 | A | * | 10/1971 | Vissers ....................... 180/6.32 |
| 4,738,328 | A | | 4/1988 | Hayden |
| 5,228,530 | A | * | 7/1993 | Tsuchihashi ................ 180/68.4 |
| 6,056,074 | A | * | 5/2000 | Heal et al. .................. 180/6.48 |
| 6,196,348 | B1 | * | 3/2001 | Yano et al. .................. 180/242 |
| 6,354,388 | B1 | * | 3/2002 | Teal et al. .................... 180/6.2 |
| 6,578,656 | B2 | * | 6/2003 | Samejima et al. ........... 180/291 |
| 6,820,403 | B2 | * | 11/2004 | Umemoto .................... 56/10.8 |
| 2002/0139600 | A1 | * | 10/2002 | Nakatani et al. ............ 180/291 |

FOREIGN PATENT DOCUMENTS

| JP | 2000-71790 | 3/2000 |
| JP | 2000-351330 | 12/2000 |

* cited by examiner

*Primary Examiner*—J. Allen Shriver
(74) *Attorney, Agent, or Firm*—The Webb Law Firm (57) ABSTRACT

A working vehicle propelled by independently driven right and left running units comprising a body frame with an engine mounted thereon; a front wheel unit for supporting the body frame in cooperation with the right and left running units; a left HST for receiving torque input from the engine; a right HST for receiving torque input from the engine; a left reduction mechanism for decelerating and transmitting torque output from the left HST to the left running unit; a right reduction mechanism for decelerating and transmitting torque output from the right HST to the right running unit; a left base block supported by the body frame, this base block forming a housing base for the left HST and a housing base for the left reduction mechanism; a right base block attached to the body frame, this base block forming a housing base for the right HST and a housing base for the right reduction mechanism. The base blocks are formed as port blocks for the HSTs, and define hydraulic ports in the housing bases for the HSTs.

22 Claims, 12 Drawing Sheets

WORKING VEHICLE PROPELLED BY INDEPENDENTLY DRIVEN RIGHT AND LEFT RUNNING UNITS

BACKGROUND OF THE INVENTION

1. Field of the Invention

This invention relates to a working vehicle propelled by independently driven right and left running units. More particularly, the invention relates to a working vehicle in which torque from an engine is divided and transmitted to right and left HSTs, and variable speed outputs of the right and left HSTs are decelerated and transmitted by right and left reduction mechanisms to right and left running units.

2. Description of the Related Art

The above working vehicle is steerable by independently shifting the right and left HSTs to set driving speeds (running speeds) and driving directions (forward or backward drive) of the right and left running units (typically rear wheels) to be different from each other. In this type of power train system of the working vehicle, the HSTs and reduction cases containing reduction mechanisms may be connected to be integral with each other. Then, by simply connecting the HSTs to the body frame, for example, the reduction cases also are connected to the body frame through the HSTs. This dispenses with a special mounting structure for connecting the reduction cases to the body frame.

An integrating connection structure for HSTs and reduction cases containing reduction mechanisms as noted above is known from Japanese Unexamined Patent Publication 2000-71790. However, where this connection structure is used, the reduction cases need to be made unnecessarily large in order to house reduction mechanisms therein for connection to the HSTs. A large space is required to accommodate the reduction cases, which enlarges the vehicle body itself, such as increasing the width and so on. Particularly, the stronger connections between the reduction cases and the HSTs result in the larger reduction cases, and thus the vehicle body.

SUMMARY OF THE INVENTION

The object of this invention is to provide a technique for simplifying and strengthening a connection structure between reduction mechanisms and HSTs, and for rigidly fixing this integrated connection structure to a body frame.

The above object is fulfilled, according to this invention, by a working vehicle as set forth at the outset hereof, comprising a body frame; a front wheel unit for supporting the body frame in cooperation with the right and left running units; an engine mounted on the body frame; a left HST for receiving torque input from the engine; a right HST for receiving torque input from the engine; a left reduction mechanism for decelerating and transmitting torque output from the left HST to the left running unit; a right reduction mechanism for decelerating and transmitting torque output from the right HST to the right running unit; a left base block supported by the body frame, the base block forming a housing base for the left HST and a housing base for the left reduction mechanism; and a right base block supported by the body frame, this base block forming a housing base for the right HST and a housing base for the right reduction mechanism.

In this construction, each HST and each reduction mechanism are connected through a common base block. The connecting surfaces of the base block also serve as housing bases for attaching respective housings thereto. Thus, the HST and the reduction mechanism, respectively, are smoothly fixed to the base block together with their own housings made small and exclusively therefor. As a result, a connection structure is created for the reduction mechanism and HST, having the base block therebetween as a core.

In a preferred embodiment of the invention, the base block is formed as a port block of the HST, and the housing base for the HST defines hydraulic ports. That is, with the base block acting as a port block for the HST, a simple structure and an easy assembling are advantageously developed.

In another preferred embodiment of the invention, the body frame extends longitudinally of the vehicle body, and has a pair of right and left first sub-frames in form of plates and a pair of right and left second sub-frames in form of plates, the first sub-frames having front ends connected to the front wheel unit, and rear ends connected to the base blocks, the second sub-frames being also connected to the base blocks. The first sub-frames and the second sub-frames are connected to each other through the base blocks to form the entire body frame. Since the base blocks form part of the body frame, corresponding dedicated parts of the body frame are dispensed with, particularly the parts supporting the reduction mechanisms and the HSTs. Simply connecting the first and second sub-frames to the port blocks will complete assembling of the body frame having the reduction mechanisms and HSTs already connected thereto.

In a further preferred embodiment of the invention, the left base block acts as a left leg fixing base for fixedly supporting a left leg of a ROPS, and the right base block acts as a right leg fixing base for fixedly supporting a right leg of the ROPS. With this structure, attachment of the ROPS may be carried out simultaneously with the connection of the base blocks and the body frame.

This invention also proposes that the HST is set such that an output rotation speed is lower than an input rotation speed for an entire shift range. This may be achieved, for example, by constructing the HST to include a pump and a motor, and such that, for the entire shift range, an oil delivery rate per rotation of the pump is lower than an oil drain rate per rotation of the motor. With this technique employed, the running units are driven with sufficient torque over the entire shift range of the HSTs even where the reduction mechanisms have a relatively small reduction ratio.

Other features and advantages of this invention will be apparent from the following description of the embodiments to be taken with reference to the drawings.

DESCRIPTION OF THE PREFERRED EMBODIMENTS

Figure 1:
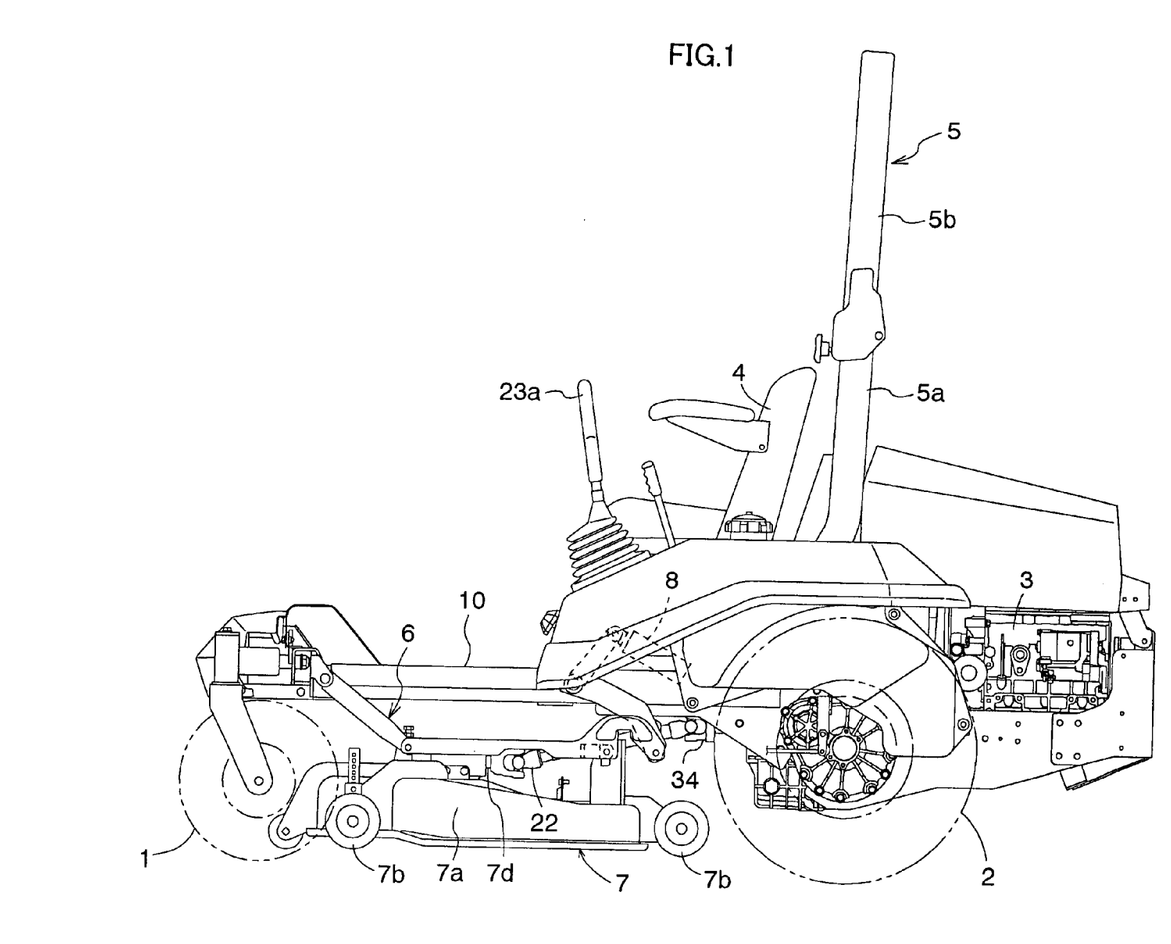
FIG. 1 is a side elevation of a riding lawn mower.
Figure 2:
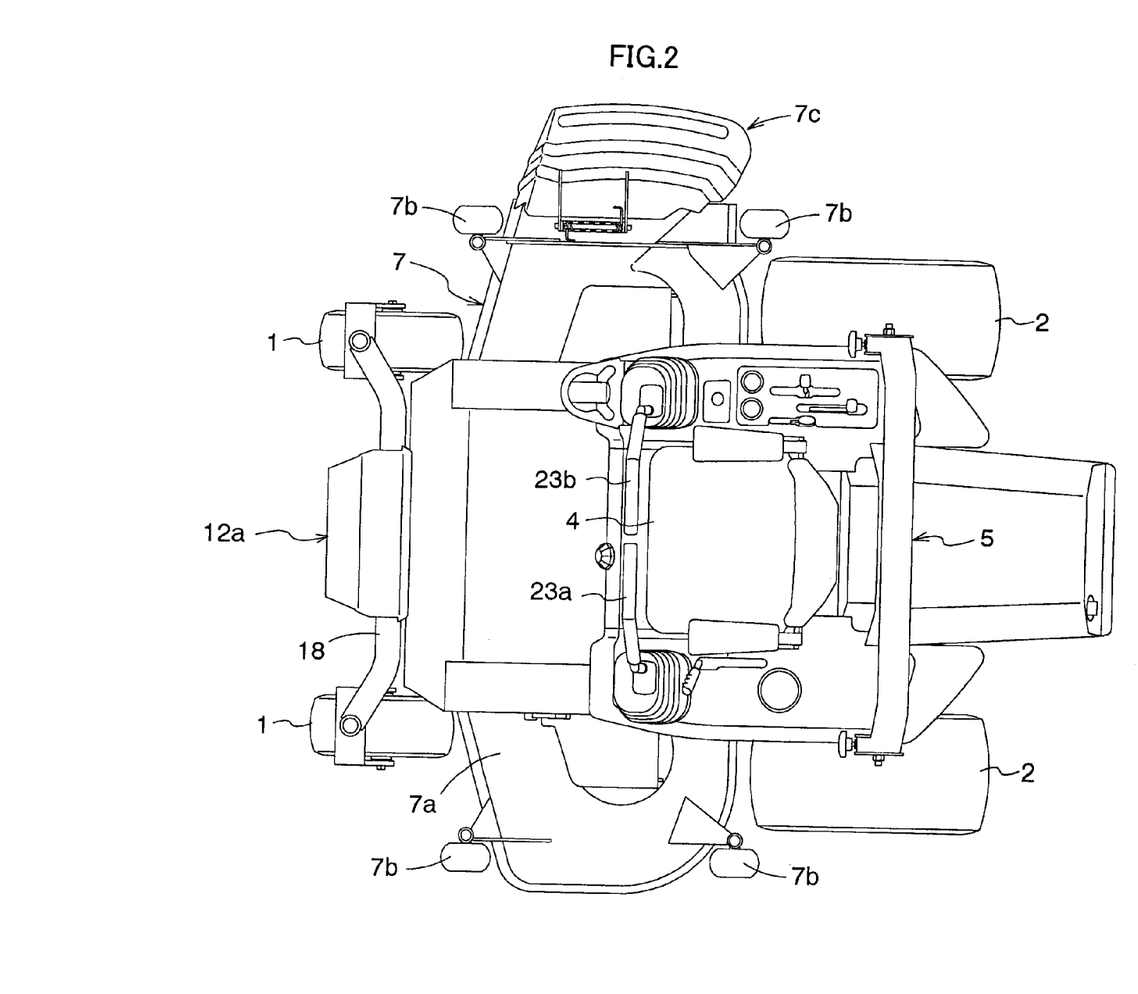
FIG. 2 is a plan view of the riding lawn mower.

As shown in FIGS. 1 and 2, a self-propelled riding lawn mower has front wheels 1 in the form of a pair of right and left caster wheels, and rear wheels 2 in the form of a pair of right and left drivable running units. The lawn mower includes a body frame 10 carrying a motor section having an engine 3 positioned in a rear end portion of the vehicle body, a driving section having a driver's seat 4 disposed forwardly of the motor section, and a ROPS 5 disposed rearwardly of the driver's seat 4. The lawn mower further includes a mower unit 7 connected to the body frame 10 between the front and rear wheels through a link mechanism 6.

In this lawn mower, the link mechanism 6 is swung up and down relative to the body frame 10 by a single-acting lift cylinder 8 disposed below the driver's seat 4, to move the mower unit 7 between a lower operative position where gauge wheels 7b disposed at the front and rear of a mower deck 7a of the mower unit 7 contact the ground, and an upper inoperative position where the gauge wheels 7b are raised above the ground. When the vehicle is operated to run with the mower unit 7 in the lower operative position, the mower unit 7 cuts grass with blades (not shown) arranged transversely in the mower deck 7a to rotatable about vertical axes by drive from the engine 3, and discharges grass clippings through a grass outlet 7c disposed at one side of the mower deck 7a. Details of the construction are as follows.

Figure 3:
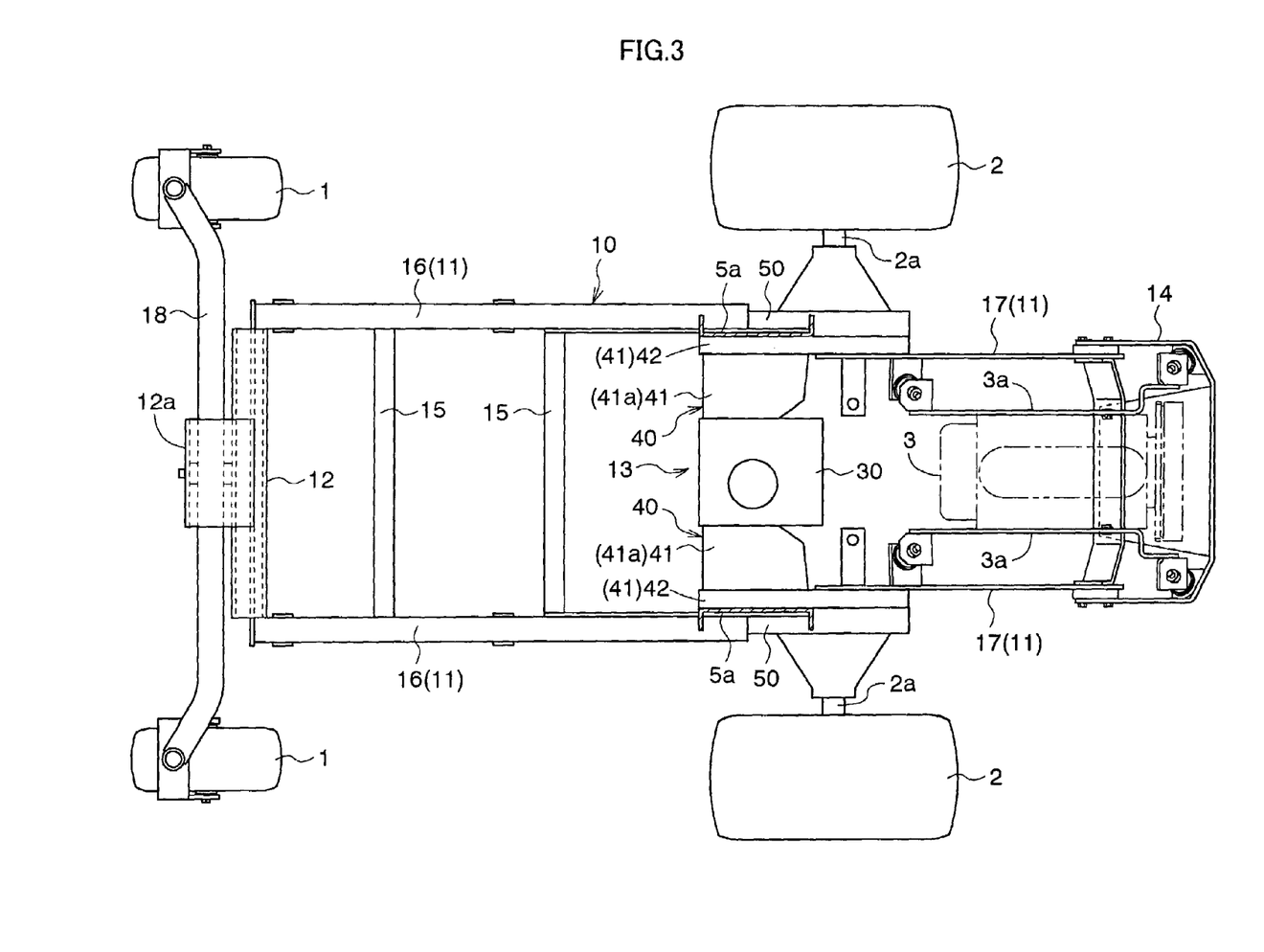
FIG. 3 is a plan view of a body frame.
Figure 4:
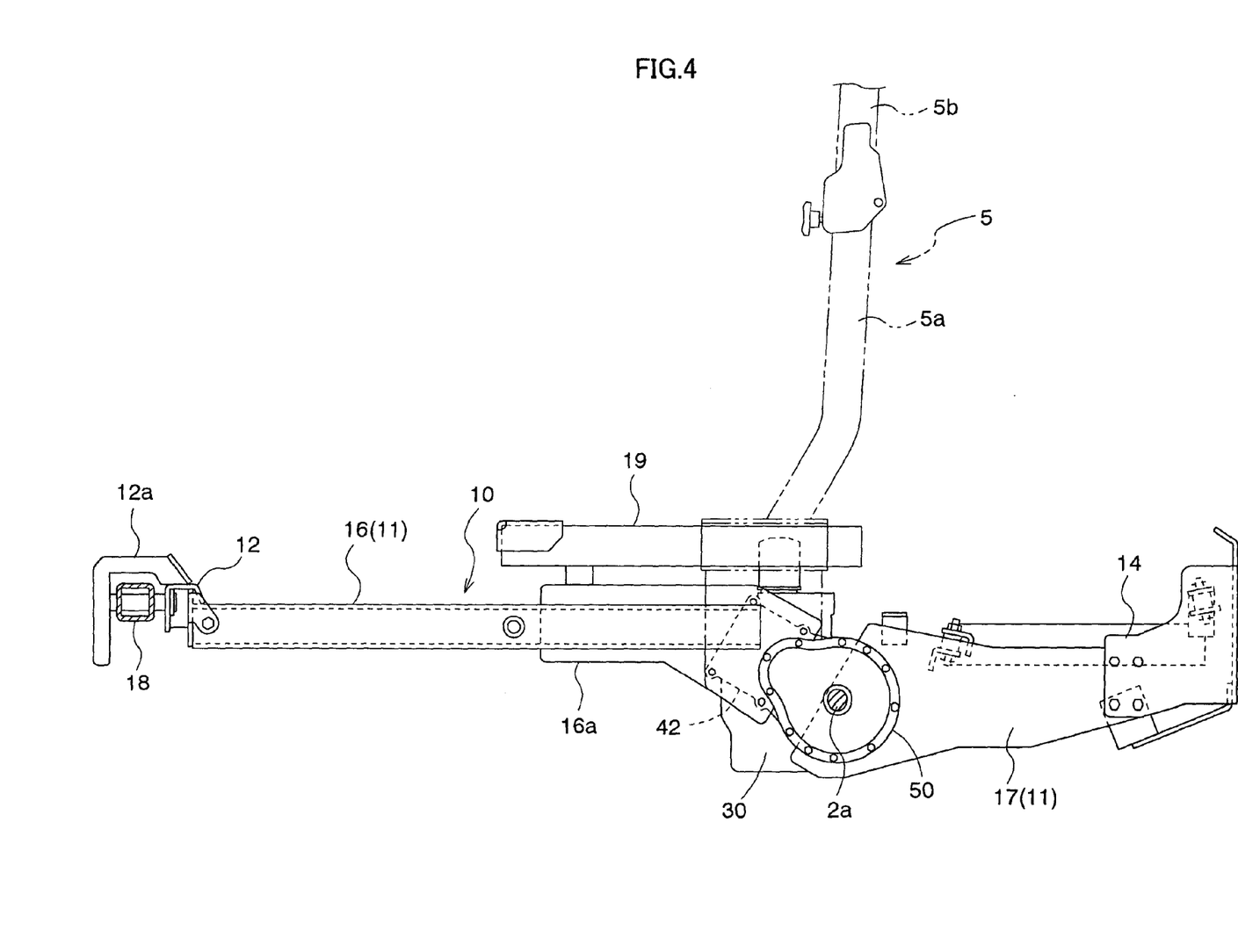
FIG. 4 is a side view of the body frame.

As shown in FIGS. 3 and 4, the body frame 10 includes a pair of right and left main body frames 11 extending longitudinally of the vehicle body, a front cross frame 12 interconnecting front ends of the right and left main body frames 11, a propelling and working transmission device 13 interconnecting middle portions of the right and left main body frames 11, a rear cross frame 14 interconnecting rear ends of the right and left main body frames 11, and connecting frames 15 interconnecting the right and left main body frames 11 between the front cross frame 12 and the transmission device 13. Each of the right and left main body frames 11 includes a first sub-frame 16 with a front end thereof connected to the front cross frame 12 and a rear end connected to the transmission device 13, and a second sub-frame 17 with a front end thereof connected to the transmission device 13 and a rear end connected to the rear cross frame 14.

The right and left front wheels 1 are supported by free ends of a front wheel support rod 18 connected in a middle position thereof, to be rotatable about an axis extending longitudinally of the vehicle body, to a front wheel support 12a disposed on the front cross frame 12. The right and left rear wheels 2 are supported by rear axles 2a extending from the transmission device 13. The link mechanism 6 is disposed between and supported by the first sub-frames 16 of the main body frames 11. The driver's seat 4 is mounted on a seat support frame 19, as shown in FIG. 4, connected between the rear ends of right and left first sub-frames 16. The engine 3 is supported by engine mounting frames 3a, as shown in FIG. 3, connected between the second sub-frames 17 of the main body frames 11 and the rear cross frames 14.

Figure 5:
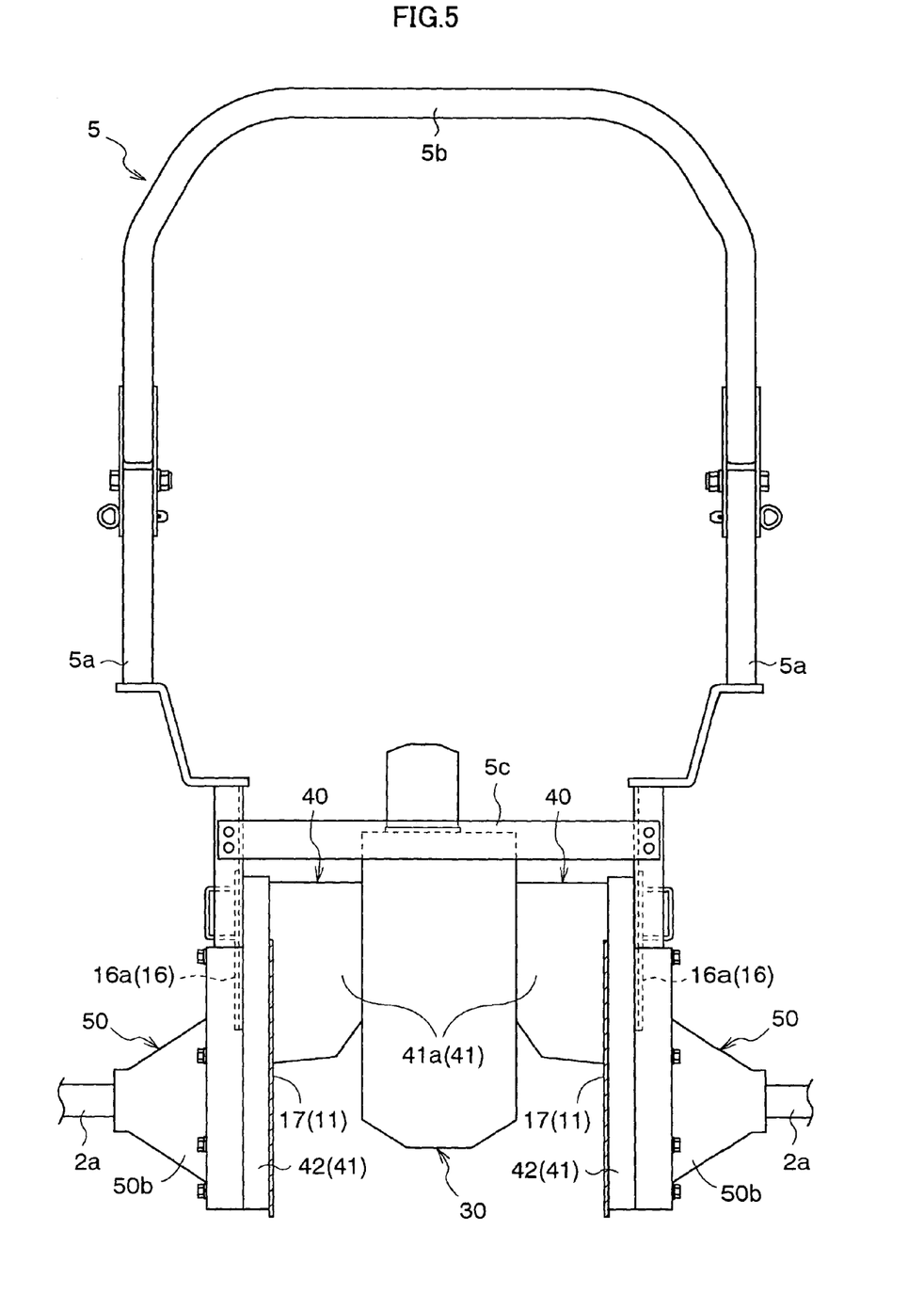
FIG. 5 is a rear view of a ROPS.

As shown in FIG. 5, the ROPS 5 includes a pair of lower frames 5a fixed to opposite sides of the body frame 10, respectively, an upper frame 5b interconnecting upper ends of the right and left lower frames 5a so that the upper frame 5b may be switched between an upstanding posture for use and a folded-down posture for storage, and a connecting frame 5c interconnecting intermediate positions of the right and left lower frames 5a.

Figure 6:
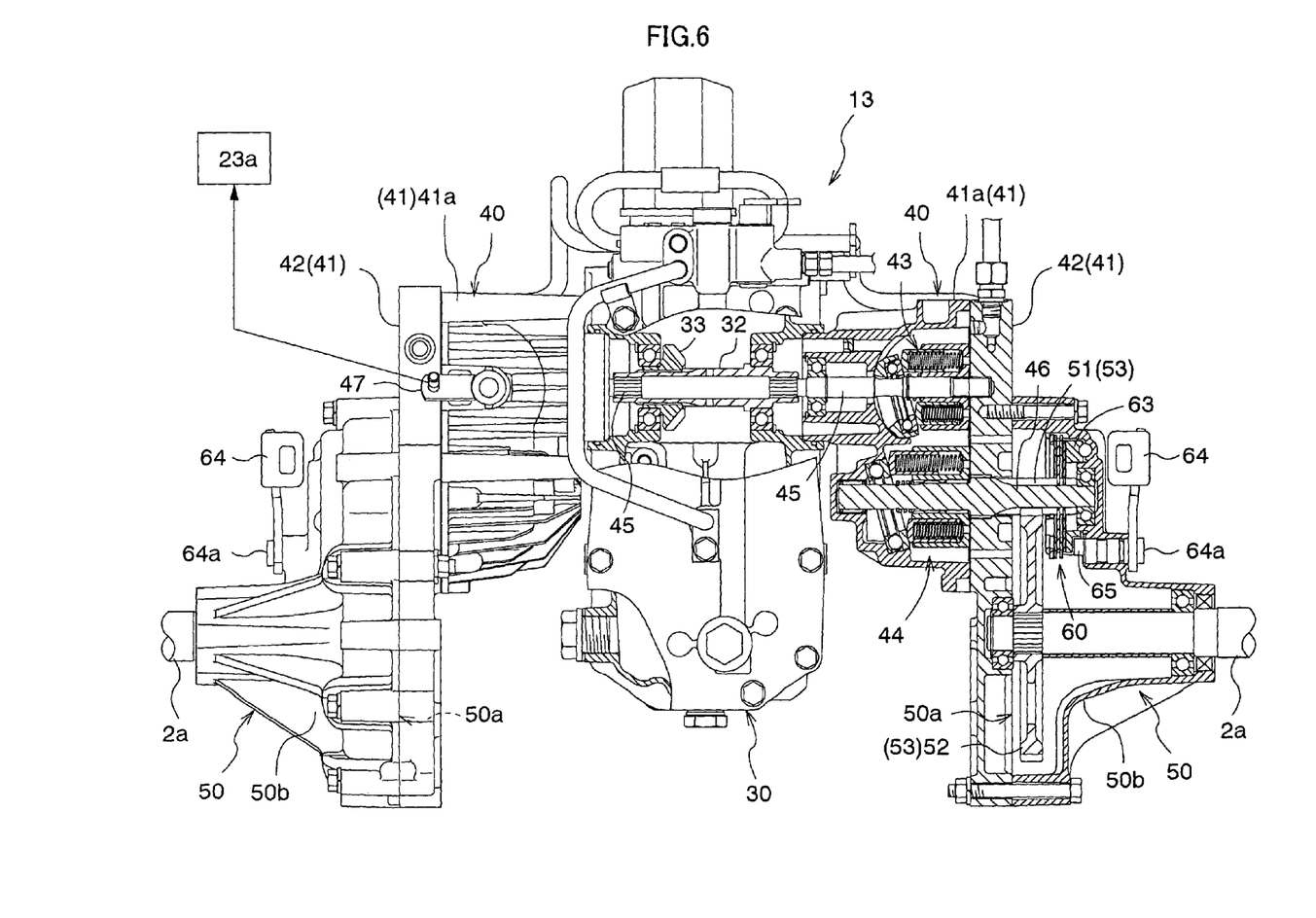
FIG. 6 is a rear view, partly in section, of a transmission device.
Figure 7:
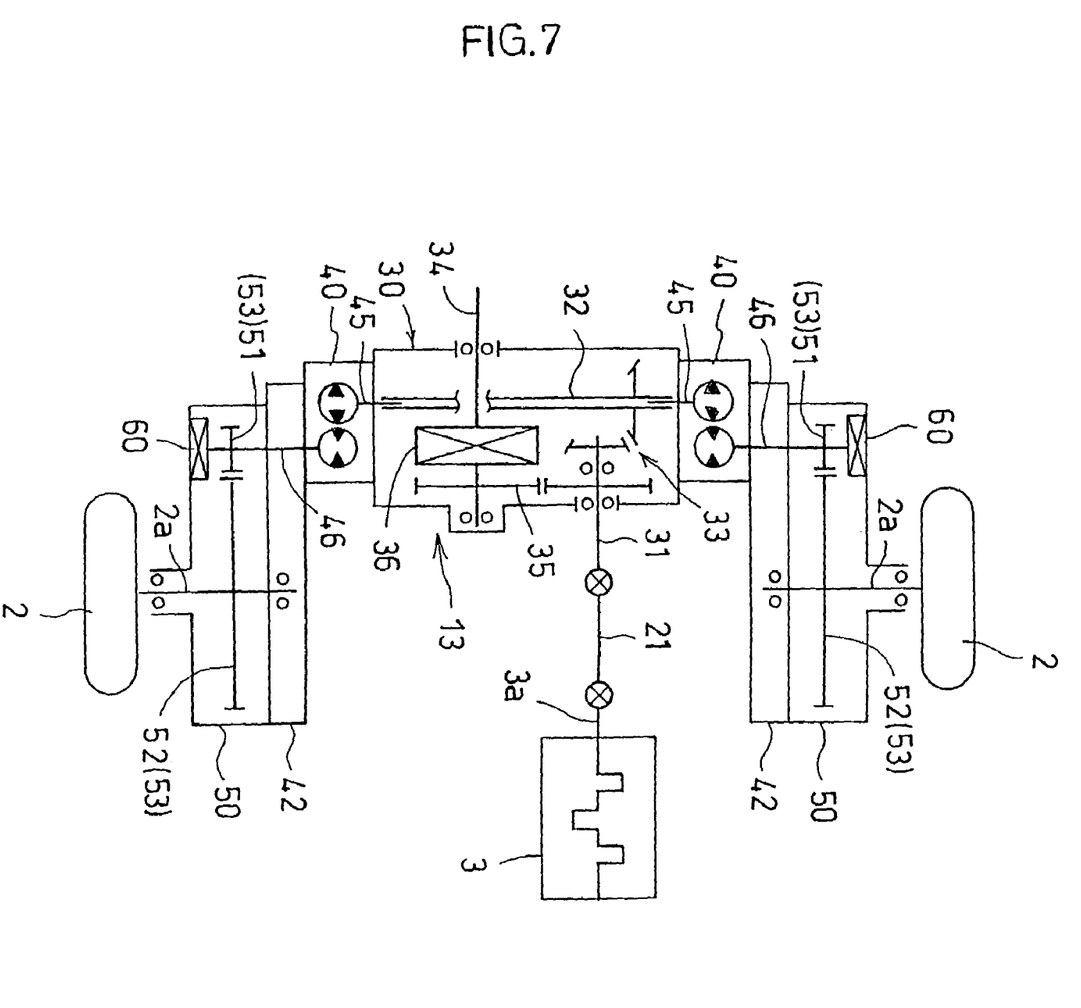
FIG. 7 is a schematic diagram of the transmission device.

As shown in FIGS. 6 and 7, the transmission device 13 includes a transmission case 30 with an input shaft 31 projecting rearward from an upper part thereof, right and left HSTs 40 having casings 41 each connected at one side thereof to an upper part of one of opposite sides of the transmission case 30, a reduction case 50 connected at an upper end portion thereof to an outward surface of the left HST 40 and having a lower end portion rotatably supporting the left rear axle 2a, and a reduction case 50 connected at an upper end portion thereof to an outward surface of the right HST 40 and having a lower end portion rotatably supporting the right rear axle 2a.

As shown in FIG. 7, the input shaft 31 of the transmission case 30 is interlocked to an output shaft 3a of the engine 3 through a rotary shaft 21. The transmission case 30 houses a tubular propelling and branching transmission shaft 32 extending transversely of the vehicle body, and a gear mechanism 33 for transmitting drive from the input shaft 31 to this propelling transmission shaft 32. A working power output shaft 34 extending longitudinally of the vehicle body is supported adjacent the lower end of the transmission case 30, and a working power gear transmission mechanism 35 is disposed in the transmission case 30 to transmit drive from the input shaft 31 to the working power output shaft 34. The working power output shaft 34 is, as shown in FIG. 1, interlocked through a rotary shaft 22 to an input shaft 7d disposed on the upper surface of the mower deck 7a of the mower unit 7.

As shown in FIGS. 6 and 7, each of the right and left HSTs 40 has an axial plunger pump 43 of the variable displacement type and an axial plunger motor 44 of the fixed displacement type mounted in the casing 41. The casing 41 includes a casing body 41a having a side surface, inwardly of the vehicle body, connected to a side of the transmission case 30, and a base block 42 connected to an outward side surface of the casing body 41a to act as a port block. Ports of the pump 43 and the motor 44 are in communication with each other through an oil channel (not shown) formed in the base block 42, i.e. port block 42. That is, the HST is formed such that the motor 44 is driven by pressure oil from the pump 43. As a result, each of the right and left HSTs 40, is switchable between a forward drive state, a backward drive state and a neutral state by changing the swash plate angle of the pump 43. In the forward drive state, drive from an input shaft 45 which is an input shaft of the pump 43 is made into forward drive, steplessly changed in speed and outputted from an output shaft 46 which is an output shaft of the motor 44. In the backward drive state, the drive from the input shaft 45 is made into backward drive, steplessly changed in speed and outputted from the output shaft 46. In the neutral state, the output from the output shaft 46 is stopped.

The input shaft 45 of the left HST 40 is splined to one end of the propelling transmission shaft 32 in the transmission case 30, and the input shaft 45 of the right HST 40 is splined to the other end of the propelling transmission shaft 32. Thus, the two input shafts 45 are rotatable with the propelling transmission shaft 32.

Figure 8:
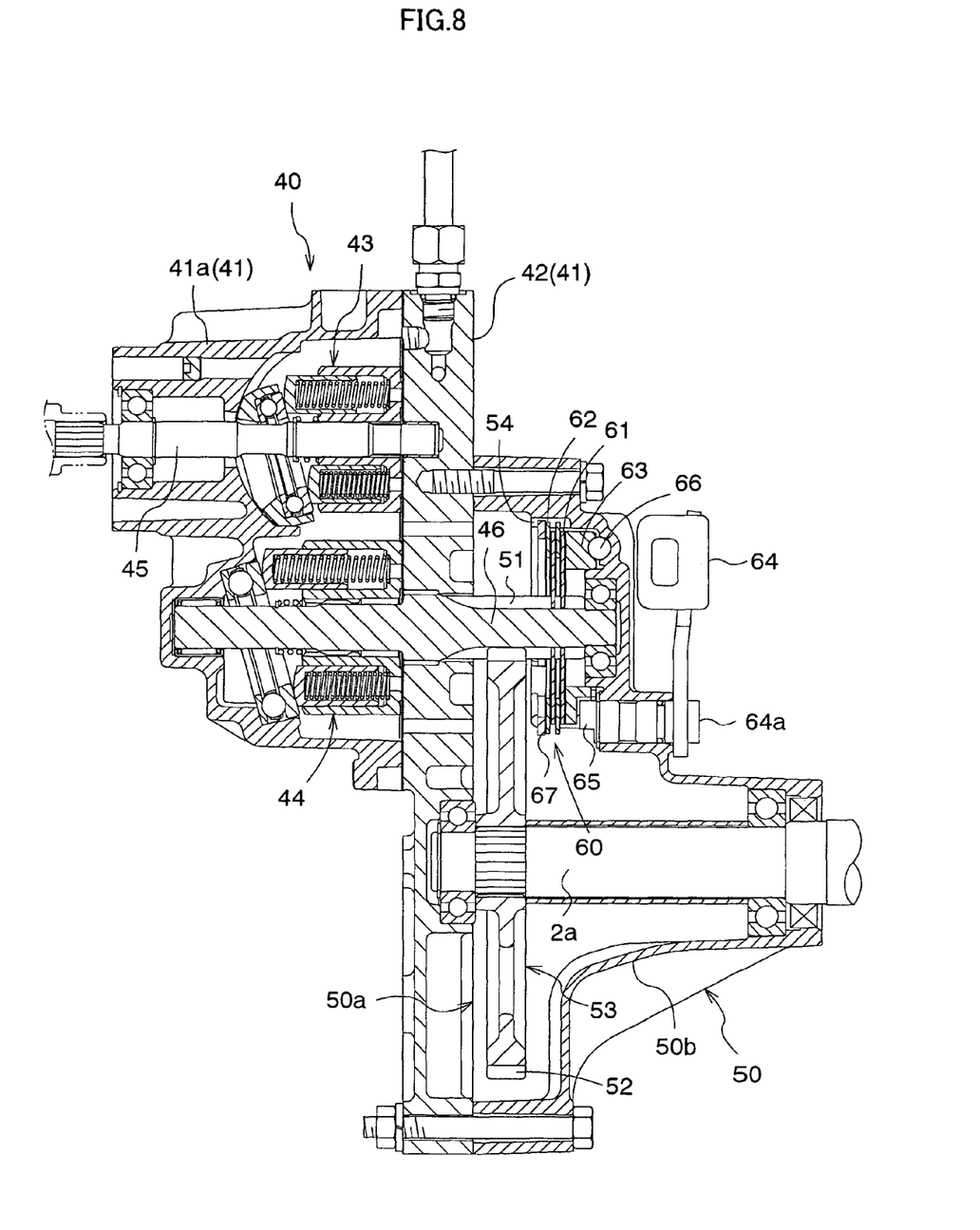
FIG. 8 is a sectional view of an HST and a reduction case.

As shown in FIG. 8, each of the reduction cases 50 for the right and left rear wheels includes a reduction case body 50b and the port block 42. The reduction case body 50b has a side defining an opening 50a abutting on an outward surface of a lower portion of the port block 42 of the HST 40 and fastened with a plurality of connecting bolts, whereby the opening 50a is closed by the port block 42. Each of the reduction cases 50 for the right and left rear wheels houses a gear type reduction mechanism 53 including an input gear 51 formed by cutting the output shaft 46 of the HST 40, and an output gear 52 in engagement with this input gear 51 and splined to the rear axle 2a for unitary rotation. The input gear 51 and the output gear 52 of the reduction mechanism 53 have a reduction gear ratio therebetween.

With this structure, the transmission device 13 receives drive transmitted from the output shaft 3a of the engine 3 through the rotary shaft 21, at the input shaft 31 of the transmission case 30 where the drive is divided for propulsion and for working by the gear mechanism 33 and the transmission mechanism 35. The drive for propulsion is then divided and transmitted to the input shafts 45 of the right and left HSTs 40, respectively, by the propelling and branching transmission shaft 32 of the transmission case 30. The propelling drive transmitted to the left HST 40 is converted to forward or backward drive and steplessly changed in speed by the HST 40, and inputted through the output shaft 46 to the left reduction case 50. The drive is decelerated by the reduction mechanism 53 of the reduction case 50, and transmitted to the left rear wheel 2 through the left rear axle 2a. The propelling drive transmitted to the right HST 40 is converted to forward or backward drive and steplessly changed in speed by the HST 40, and inputted through the output shaft 46 to the right reduction case 50. The drive is decelerated by the reduction mechanism 53 of the reduction case 50, and transmitted to the right rear wheel 2 through the right rear axle 2a. The drive divided for working in the transmission case 30 is outputted forwardly of the vehicle body from the working power output shaft 34 through the rotary shaft 22 to the mower unit 7.

In each of the right and left HSTs 40, the swash plate angle of the pump 43 is changed by rocking a shift controller 47, as shown in FIG. 6, positioned outwardly of the upper portion of the casing 41. The shift controller 47 of the left HST 40 is interlocked through a link mechanism (not shown) to a left steering lever 23a of a pair of right and left steering levers 23a and 23b arranged in the driving section as shown in FIG. 2. The shift controller 47 of the right HST 40 is interlocked to the right steering lever 23b in the same way.

That is, rocking the right and left steering levers 23a, 23b, respectively, longitudinally of the vehicle body, shifts the right and left HSTs 40 to drive the rear wheels 2 at the same speed forward or backward to cause the vehicle to run straight forward or backward, and further, to drive the rear wheels 2 at different speeds or in different directions to cause the vehicle to change its running direction.

As shown in FIG. 7, the working power transmission mechanism 35 in the transmission case 30 has a working clutch 36 for switching on and off transmission of the drive from the input shaft 31 to the working power output shaft 34, thereby switching on and off the drive for the mower unit 7.

As shown in FIG. 8, each of the right and left reduction cases 50 has a propelling brake 60 including a plurality of brake disks 61 mounted on the output shaft 46.

Each of the right and left brakes 60 includes a plurality of friction plates 62 supported by a support portion 54 of the reduction case 50 and a control ring 63, in addition to the brake disks 61. Each of the brake disks 61 has a mounting bore with spline teeth mounted on the output shaft 46 to be slidable relative to and rotatable with the input gear 51 formed on the output shaft 46. Each of the friction plates 62 is engaged with the support portion 54 to be slidable in directions along the output shaft 46, but not rotatable relative to the support portion 54.

That is, when a control lever 64 positioned outside the reduction case 50 is rocked about the axis of a rotary shaft 64a, a control cam 65 attached to an end of the rotary shaft 64a to be rotatable therewith turns the control ring 63 through a preset angle of rotation. Then, the control ring 63 slides toward the brake disks 61 under the action of cam balls 66, thereby pressing the brake disks 61 and the friction plates 62 to a support ring 67 fixed to the support portion 54. The propelling brake 60 applies a frictional braking force to the brake disks 61. This force is then applied through the input gear 51 and the output gear 52 to the rear wheel axle 2a, thus braking the rear wheel 2.

In each of the right and left HSTs 40, the plunger capacity of the pump 43 is set to be smaller than that of motor 44. Thus, at any forward or backward speed from the lowest to the highest, an oil delivery rate per rotation of the pump 43 is smaller than an oil drain rate per rotation of the motor 44. In short, the output speed of each HST 40 is set to be low for the input speed even when HST 40 is shifted for the highest speed.

That is, as the HST 40 may fail to perform a satisfactory driving function when the speed of inputted torque is insufficient, it is necessary to input drive with a sufficient rotational frequency to the HST 40. An adequate torque is thereby transmitted to the rear wheel 2 regardless of a speed state to which the HST 40 is shifted. Where this state of transmission were achieved solely through the deceleration by the reduction mechanism 53, the reduction mechanism 53 would be required to provide an increased reduction ratio. This invention achieves such a state of transmission while allowing the reduction mechanism 53 to have a relatively small a reduction ratio, thereby to realize compactness of the reduction mechanism 53.

Figure 9:
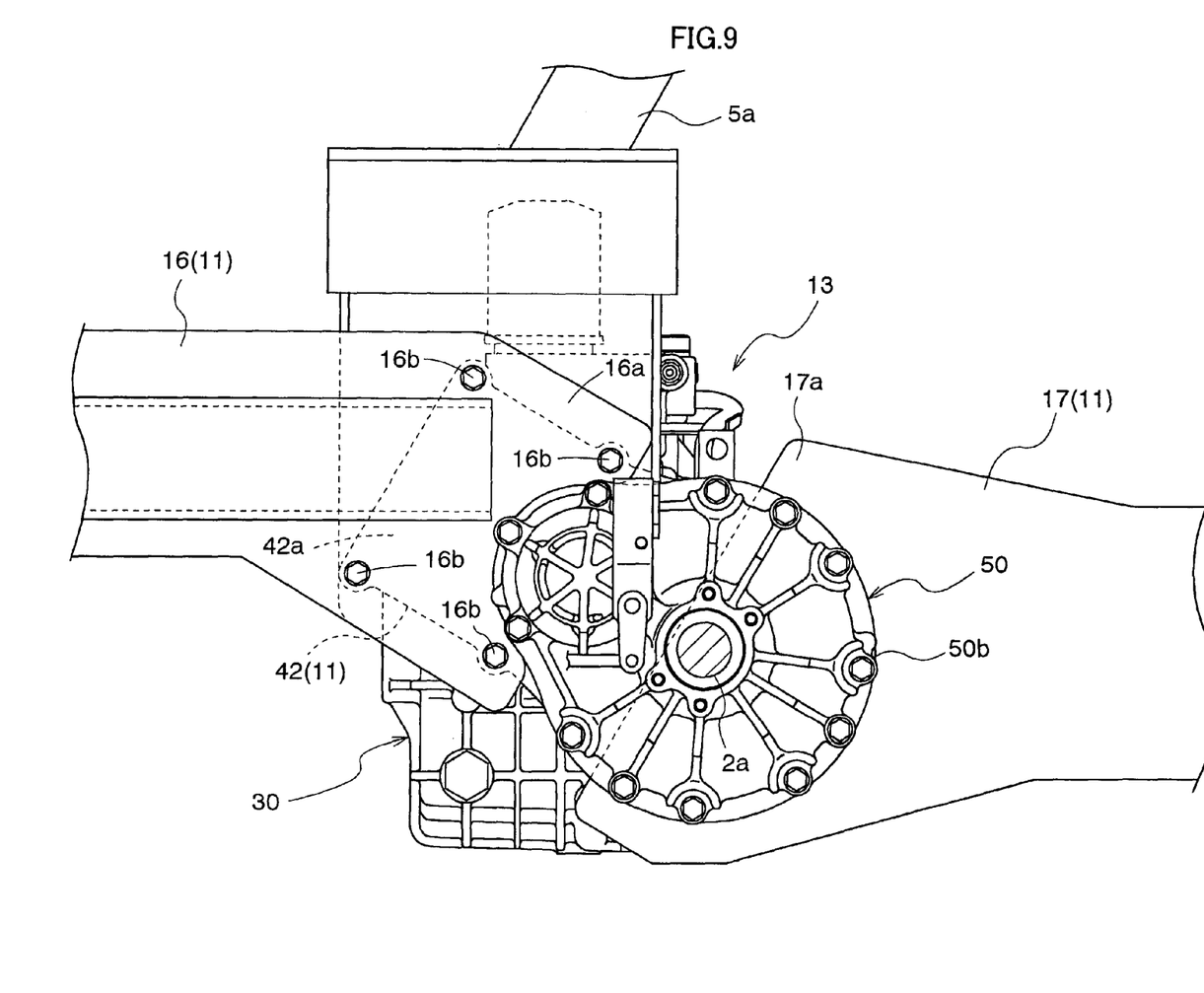
FIG. 9 is a side view showing a connection structure between first and second sub-frames and a base block as seen from outside the vehicle body.
Figure 10:
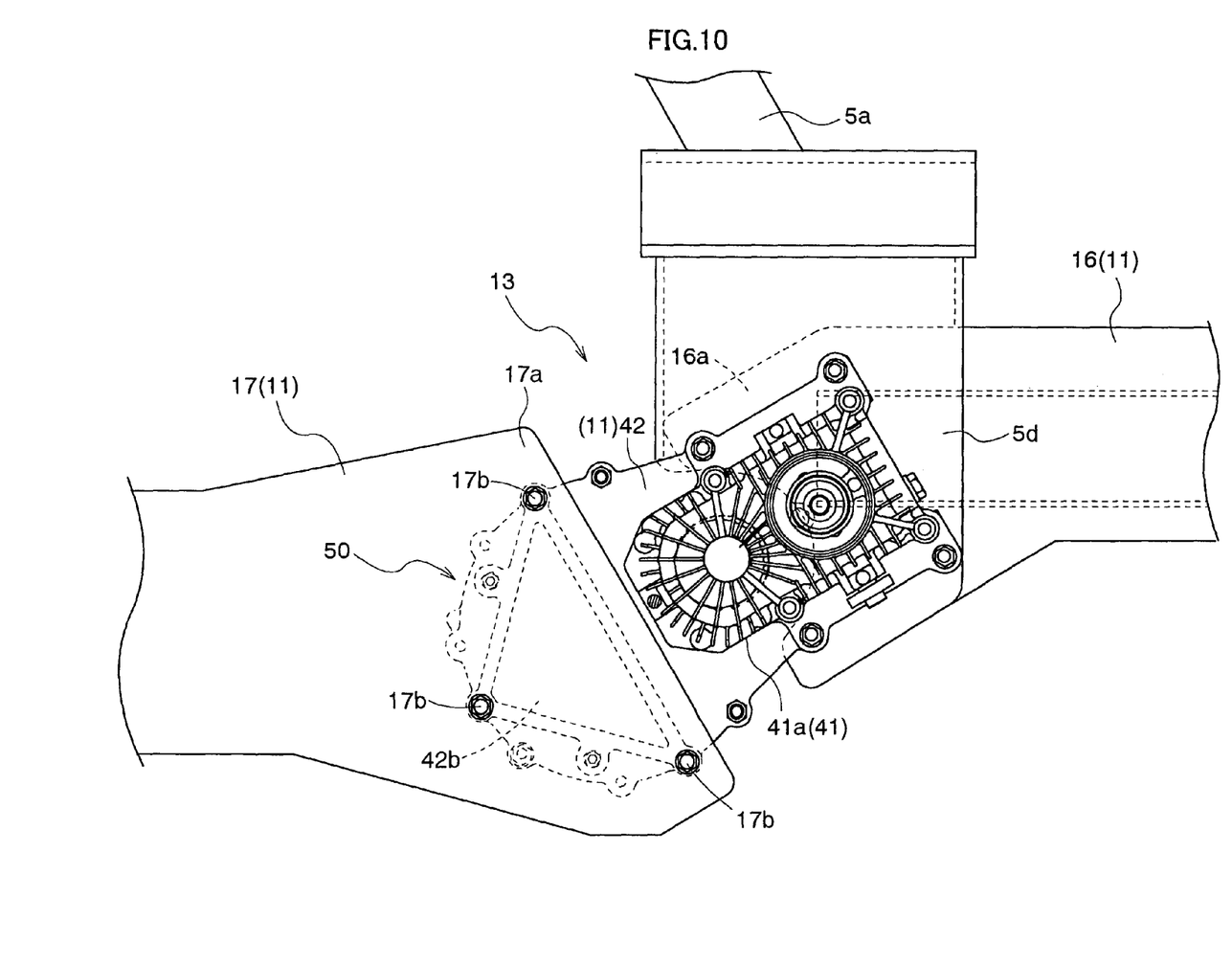
FIG. 10 is a side view showing the connection structure between the first and second sub-frames and the base block as seen from inside the vehicle body.
Figure 11:
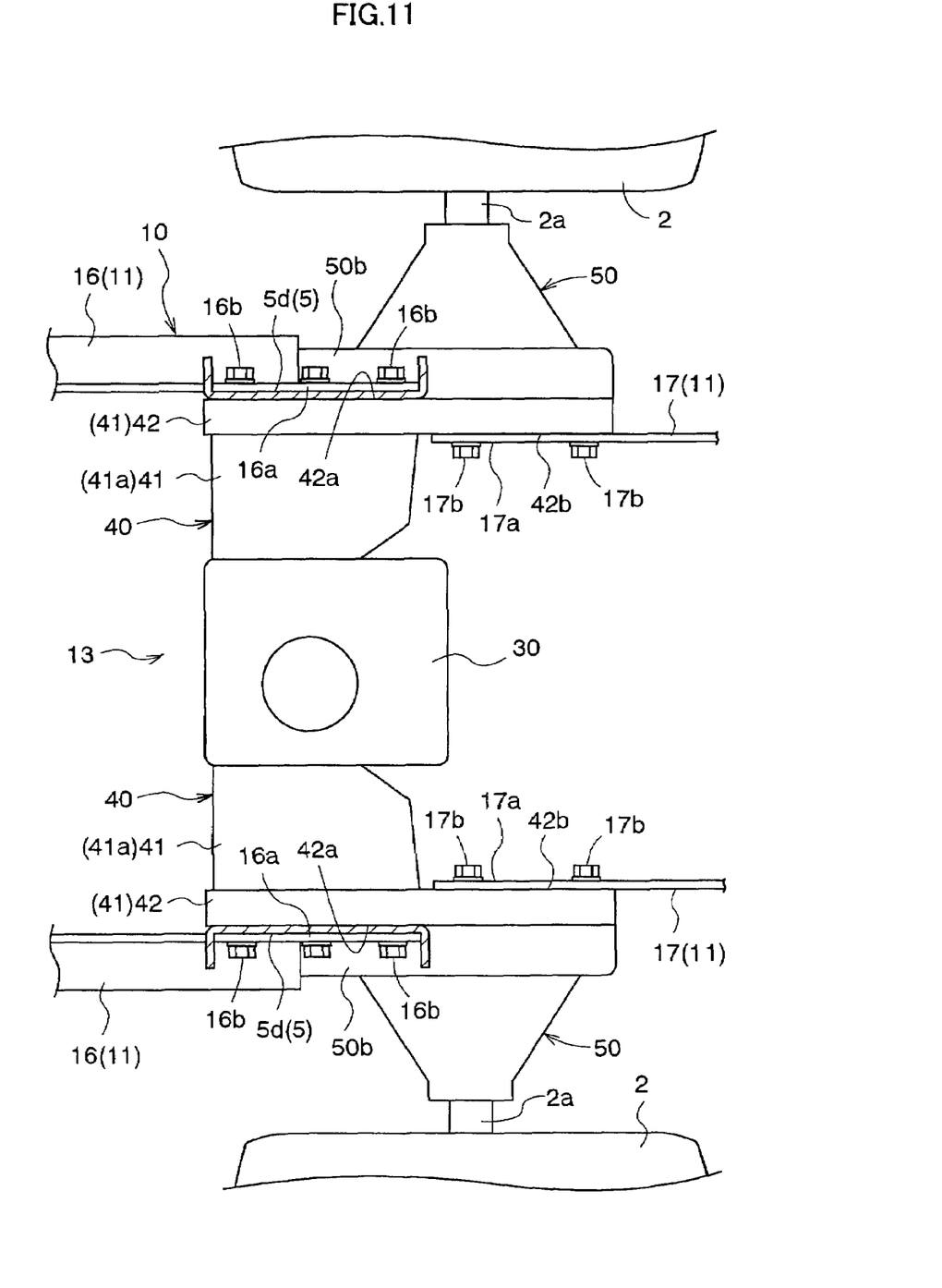
FIG. 11 is a plan view showing the connection structure between the first and second sub-frames and the base blocks.

The first sub-frames 16 and second sub-frames 17 of the right and left main body frames 11 are connected to the transmission device 13, and the lower frames 5a of the ROPS 5 are fixed to the body frame 10 as shown in FIGS. 9 through 11.

Figure 12:
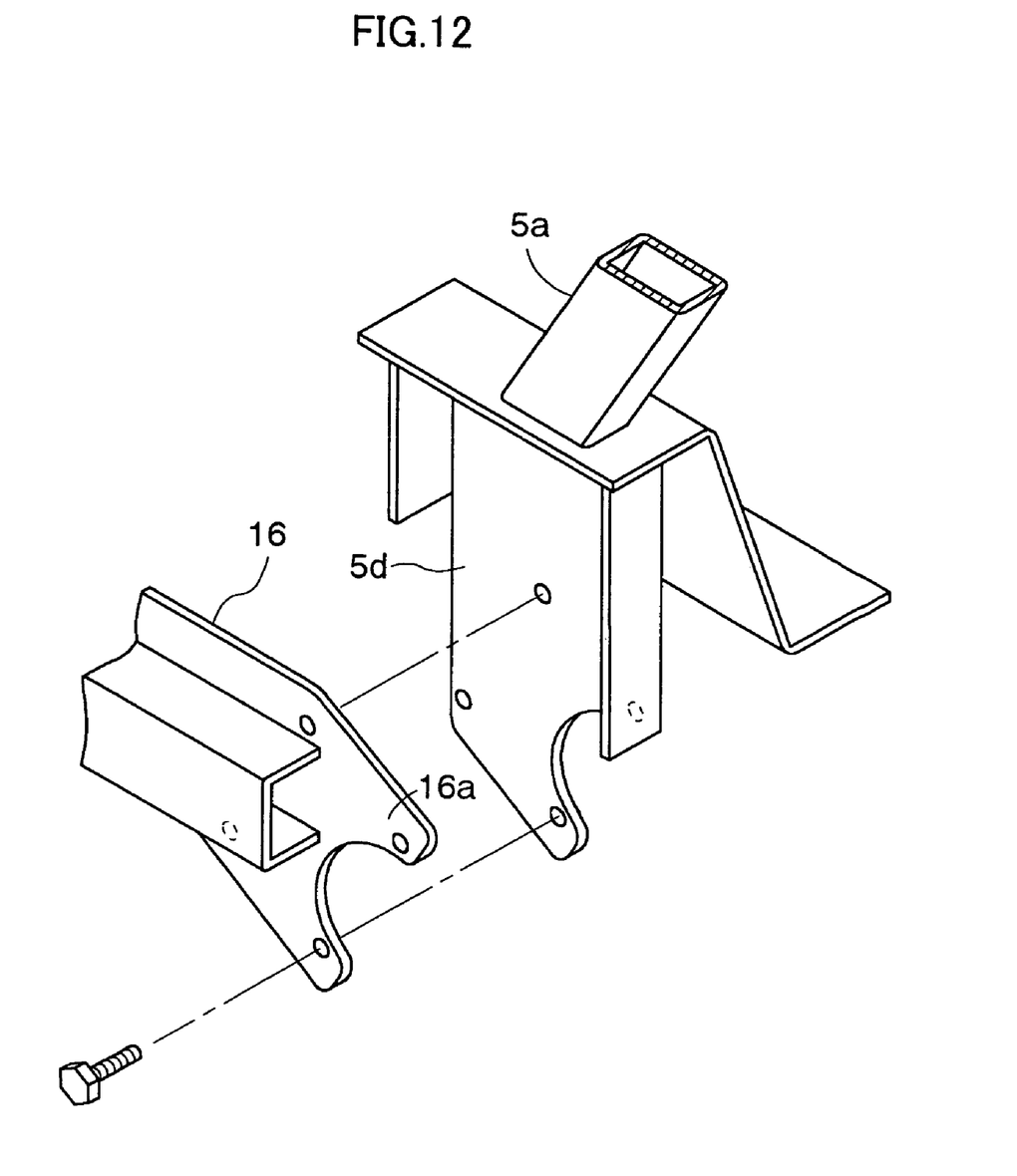
FIG. 12 is a perspective view showing a rear end of the first sub-frame and a proximal portion of the ROPS.

Specifically, a rear end 16a of each first sub-frame 16 as shown in FIG. 12 is fitted and fastened by connecting bolts 16b to an outward side surface of a portion 42a of the port block 42 of one of the right and left HSTs 40, the portion 42a lying forwardly of the reduction case body 50b connected to the port block 42. A front end 17a of each second sub-frame 17 is fitted to and fastened by connecting bolts 17b to an inward side surface of a portion 42b of the port block 42 of one of the right and left HSTs 40, the portion 42b lying rearwardly of the casing body 41a connected to the port block 42.

A proximal end 5d of each of the right and left lower frames 5a of the ROPS 5 is placed inwardly of the rear end 16a of one of the right and left first sub-frames 16, and fastened along with the first sub-frames 16 to the front portion 42a of the port block 42 by the connecting bolts 16b.

[Other Embodiments]

In the above embodiment, the reduction case 50 is mounted so that the rear axle 2a is positioned rearward of the input section. Consequently, the front end of the port block 42 is free from the connection with the reduction case body 50b, and the rear end of the port block 42 is free from the connection with the casing body 41a of the HST 40. Further, the rear end 16a of the first sub-frame 16 is connected to the portion 42a at the front end of the port block 42 free from the connection with the reduction case body 50b. The front end of the second sub-frame 17b is connected to the portion at the rear end of the port block 42 free from the connection with the casing body 41a of the HST. On the other hand, where the reduction case 50 is mounted so that the rear axle 2a is positioned forward of the input section, the front end of the port block 42 is free from the connection with the casing body 41a of the HST 40, and the rear end of the port block 42 is free from the connection with the reduction case body 50b. Further, the rear end 16a of the first sub-frame 16 is connected to the portion, at the front end of the port block 42, free from the connection with the casing body 41a of the HST. The front end of the second sub-frame 17 is connected to the portion, at the rear end of the port block 42, free from the connection with the reduction case body 50b. Thus, the first sub-frame 16 is called a first body frame 16 having one end, longitudinally of the vehicle body, connected to the portion 42a at one end, longitudinally of the vehicle body, of the port block 42. The portion 42a is free from the connection with the reduction case body 50b. Further, the second sub-frame 17 is called a second body frame 17 having the other end, longitudinally of the vehicle body, connected to the portion 42b at the other end, longitudinally of the vehicle body, of the port block 42. The portion 42b is free from the connection with the casing body 41a of the HST.

This invention is applicable to various vehicles such as tractors and so forth, in addition to lawn mowers. The invention is applicable also to vehicles using crawler-type running units in place of rear wheels 2. Lawn mowers, tractors and the like are collectively called herein a working vehicle, and rear wheels 2 and crawler-type running units are collectively called herein running units 2.

What is claimed is:

1. A working vehicle propelled by independently driven right and left running units, comprising:
   a body frame;
   a front wheel unit for supporting said body frame in cooperation with said right and left running units;
   an engine mounted on said body frame;
   a left stepless transmission for receiving torque input from said engine;
   a right stepless transmission for receiving torque input from said engine;
   a left reduction mechanism for decelerating and transmitting torque output from said right stepless transmission to said right running unit;
   a left base block supported by said body frame, said base block forming a housing base for said left stepless transmission and a housing base for said left reduction mechanism; and
   a right base block supported by said body frame, said base block forming a housing base for said right stepless transmission and a housing base for said right reduction mechanism.

2. A working vehicle as defined in claim 1, wherein said stepless transmission is formed as an HST and said left base block is formed as a port block for said left HST, said housing base for the left HST defining a hydraulic port, and said right base block is formed as a port block for said right HST, said housing base for the right HST defining a hydraulic port.

3. A working vehicle as defined in claim 1, wherein said right and left blocks are formed as thick-walled plates, said housing base for said HST being formed on a surface, inwardly of the vehicle body, of each of said plates, and said housing base for said reduction mechanism being formed on a surface, outwardly of the vehicle body, of each of said plates.

4. A working vehicle as defined in claim 1, wherein said body frame extends longitudinally of the vehicle body, and has a pair of right and left first sub-frames in form of plates and a pair of right and left second sub-frames in form of plates, said first sub-frames having front ends connected to said front wheel unit, and rear ends connected to said base blocks, said second sub-frames being also connected to said base blocks.

5. A working vehicle as defined in claim 1, wherein said left base block acts as a left leg fixing base for fixedly supporting a left leg of a ROPS, and said right base block acts as a right leg fixing base for fixedly supporting a right leg of said ROPS.

6. A working vehicle as defined in claim 5, wherein said right and left blocks are formed as thick-walled plates, said right and left legs of said ROPS being fixed to surfaces, outwardly of the vehicle body, of the right and left plates.

7. A working vehicle as defined in claim 2, wherein said HST is set such that an output rotation speed is lower than an input rotation speed for an entire shift range.

8. A working vehicle as defined in claim 7, wherein said HST includes a pump and a motor, and is constructed such that, for the entire shift range, an oil delivery rate per rotation of said pump is lower than an oil drain rate per rotation of said motor.

9. A working vehicle as defined in claim 1, wherein each of said right and left stepless transmissions is an HST and each said HST being set such that an output rotation speed is lower than an input rotation speed for an entire shift range.

10. A working vehicle as defined in claim 1, wherein each of said right and left base blocks has a rear axle support.

11. A working vehicle as defined in claim 10, wherein each of said rear axle support includes a recess formed in the respective base block.

12. A working vehicle as defined in claim 11, wherein each of said rear axle support further includes a bearing mechanism mounted to the respective recess.

13. A working vehicle as defined in claim 10, wherein each of said right and left stepless transmission has a hydraulic pump and, wherein each of said right and left base blocks has a support portion for an input shaft of respective hydraulic pump.

14. A working vehicle as defined in claim 13, wherein said support portion includes a recess formed in the respective base block.

15. A working vehicle as defined in claim 1, wherein said housing base for said left stepless transmission closes an opening of a housing for said left stepless transmission, and housing base for said left reduction mechanism closes an opening of a housing for said left reduction mechanism, and wherein said housing base for said right stepless transmission closes an opening of a housing for said right stepless transmission, and housing base for said right reduction mechanism closes an opening of a housing for said right reduction mechanism.

16. A working vehicle as defined in claim 1, wherein said left stepless transmission is mounted to the left base block at a position offset from said left reduction mechanism, and wherein said right stepless transmission is mounted to the right base block at a position offset from said right reduction mechanism.

17. A working vehicle propelled by independently driven right and left running units, comprising:
- a body frame;
- a front wheel unit for supporting said body frame in cooperation with said right and left running units;
- an engine mounted on said body frame;
- a left stepless transmission for receiving torque input from said engine;
- a right stepless transmission for receiving torque input from said engine;
- a left reduction mechanism for decelerating and transmitting torque output from said left stepless transmission to said left running unit;
- a right reduction mechanism for decelerating and transmitting torque output from said right stepless transmission to said right running unit;
- a left base block supported by said body frame, said base block forming a housing base for said left stepless transmission, a housing base for said left reduction mechanism, and a recess for supporting an axle of the left running unit;
- a right base block supported by said body frame, said base block forming a housing base for said right stepless transmission, a housing base for said right reduction mechanism and a recess for supporting an axle of the right running unit.

18. A working vehicle as defined in claim 17, wherein a bearing mechanism is mounted to each of said recesses formed in respective base block.

19. A working vehicle as defined in claim 17, wherein each of said base block is an integral one piece member.

20. A working vehicle as defined in claim 19, wherein each of said right and left stepless transmission has a hydraulic pump and wherein each of said right and left base blocks has a recess for supporting an input shaft of respective hydraulic pump.

21. A working vehicle propelled by independently driven right and left running units, comprising:
- a body frame;
- a front wheel unit for supporting said body frame in cooperation with said right and left running units;
- an engine mounted on said body frame;
- a left stepless transmission for receiving torque input from said engine;
- a right stepless transmission for receiving torque input from said engine;
- a left reduction mechanism for decelerating and transmitting torque output from said left stepless transmission to said left running unit;
- a right reduction mechanism for decelerating and transmitting torque output from said right stepless transmission to said right running unit;
- a left base block supported by said body frame, said base block forming a housing base that closes an opening of a housing for said left stepless transmission and a housing base that closes an opening of a housing for said left reduction mechanism; and
- a right base block supported by said body frame, said base block forming a housing base that closes an opening of a housing for said right stepless transmission and a housing base that closes an opening of a housing for said right reduction mechanism.

22. A working vehicle as defined in claim 21, wherein each of said right and left stepless transmissions is an HST and said HST being set such that an output rotation speed is lower than an input rotation speed for an entire shift range.

* * * * *